Aug. 26, 1924.
N. M. WILLIAMS
SHOCK ABSORBER
Filed March 29, 1923  3 Sheets-Sheet 1
1,506,703
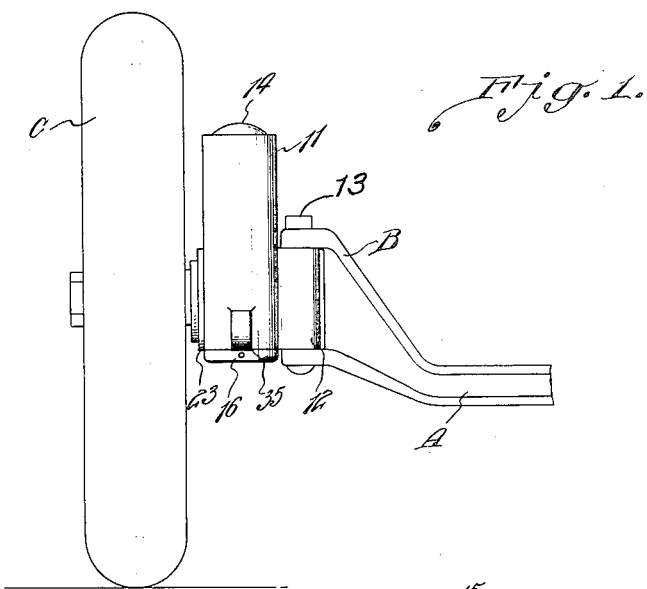
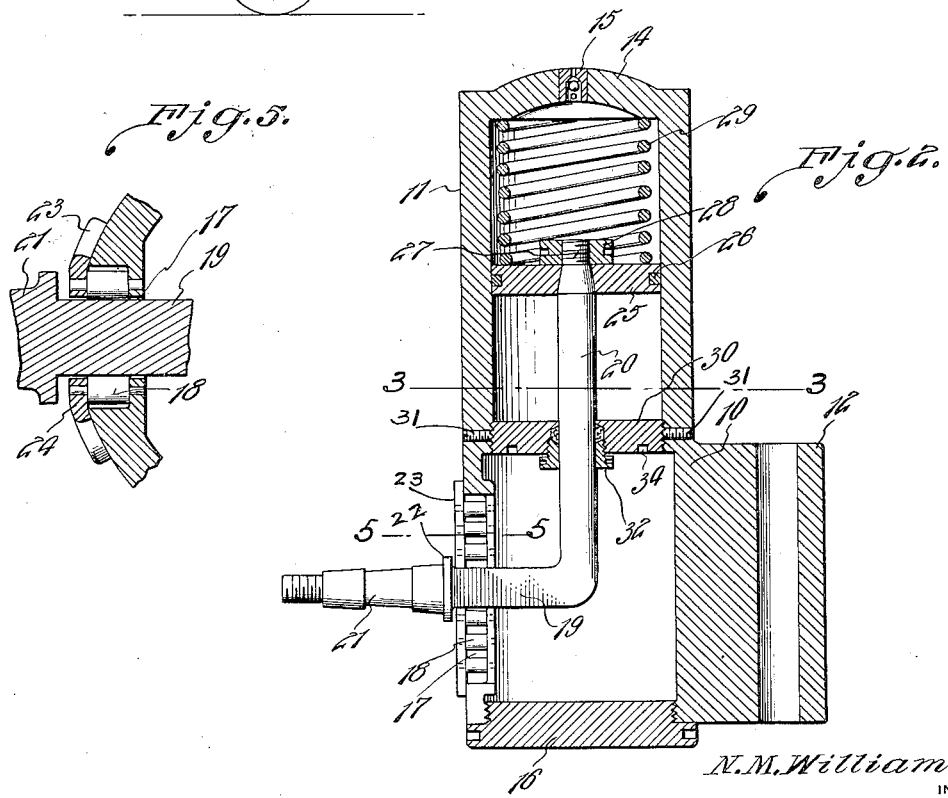
N. M. Williams
INVENTOR
BY Victor J. Evans
ATTORNEY
WITNESS:

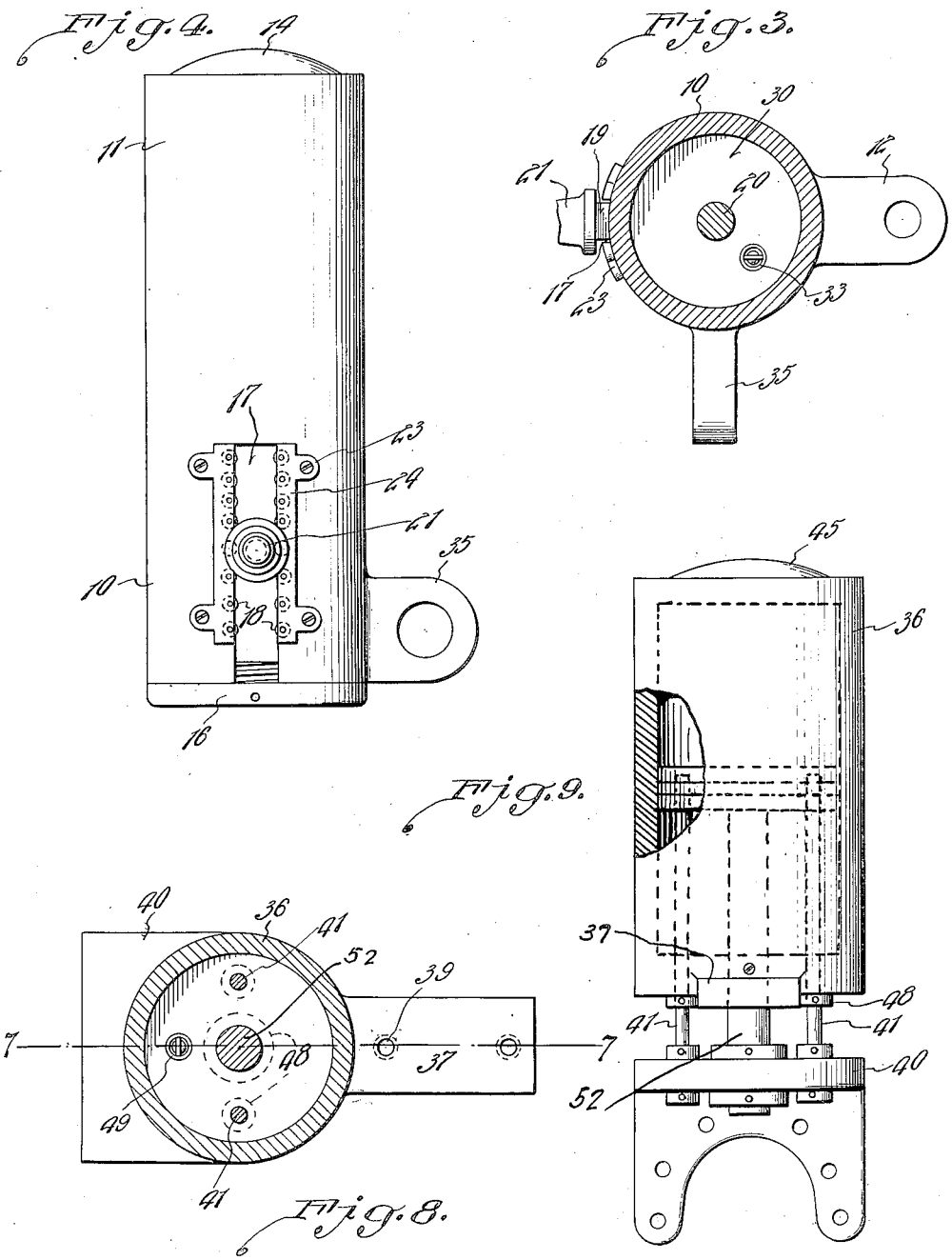

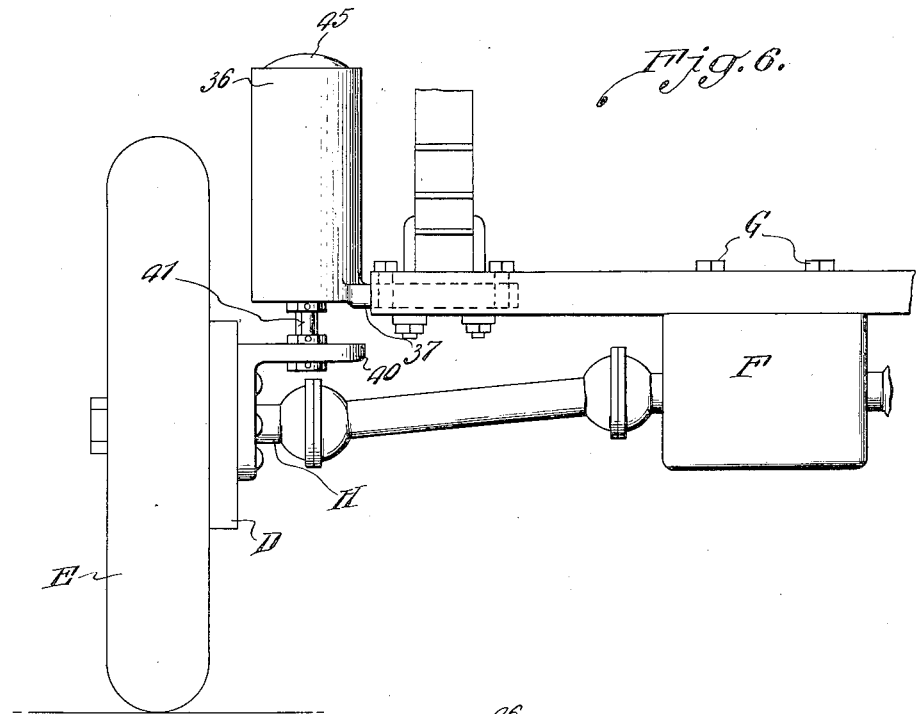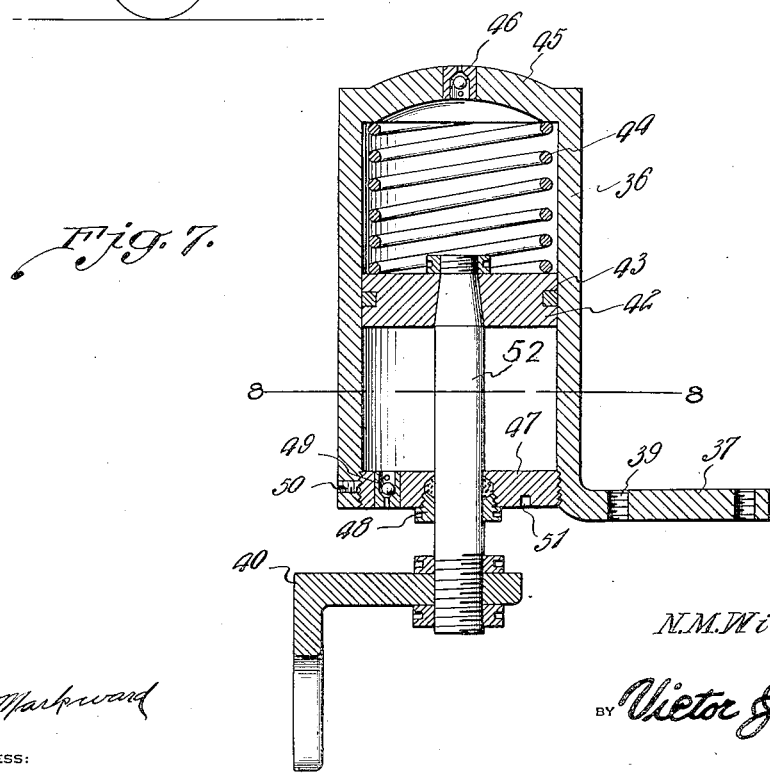

Patented Aug. 26, 1924.

1,506,703

UNITED STATES PATENT OFFICE.

NOBLE M. WILLIAMS, OF VALLEJO, CALIFORNIA.

SHOCK ABSORBER.

Application filed March 29, 1923. Serial No. 628,584.

*To all whom it may concern:*

Be it known that I, NOBLE M. WILLIAMS, a citizen of the United States, residing at Vallejo, in the county of Solano and State of California, have invented new and useful Improvements in Shock Absorbers, of which the following is a specification.

This invention relates to attachments or accessories for motor vehicles and has for its object the provision of a novel shock absorber structure including slightly varying forms adapted for use at the front and rear of a vehicle, the devices at the front including spindles which are spring supported and which replace the usual spindles upon which the front wheels are journaled and the devices at the rear being attached to the frame and to the stationary flanges against the outer sides of which the rear wheels rotate, the entire structure having the advantage of resiliently supporting the entire frame of the vehicle with respect to the axles so that the maximum easy riding will be assured.

An important object is the provision of a device of this character in which the front members, or those associated with the front axle have the steering means connected therewith, these members being pivoted upon the axle in the same manner as the ordinary spindle body.

Another object is the provision of a structure of this character which is so constructed that dust, dirt and grit will be excluded and which will be, moreover, comparatively simple and inexpensive in manufacture and installation, highly efficient in use, durable in service and a general improvement in the art.

With the above and other objects and advantages in view the invention consists in the details of construction to be hereinafter more fully described and claimed and illustrated in the accompanying drawings, in which:

Figure 1 is a fragmentary elevation of the front axle of a vehicle showing one of my shock absorbers applied thereto, Figure 2 is a longitudinal section through one of the shock absorbers for the front, Figure 3 is a horizontal section on the line 3—3 of Figure 2, Figure 4 is an elevation at right angles to Figure 2, Figure 5 is a detail cross section on the line 5—5 of Figure 2, Figure 6 is a fragmentary elevation of the rear axle showing one of the rear absorber elements mounted thereon, Figure 7 is a longitudinal section on the line 7—7 of Figure 8, Figure 8 is a cross section on the line 8—8 of Figure 7 and Figure 9 is an elevation at right angles to Figure 7.

Referring more particularly to the drawings the letter A represents the front axle of a vehicle which would naturally need to be somewhat shorter than the ordinary front axle to compensate for the difference in the size of the front shock absorber member I provide and the size of the ordinary spindle body with spindle thereon. The axle would naturally terminate at its ends in yokes B as is ordinarly the case. In carrying out my invention as applied to the front axle, I provide a body 10 which in actual practice would be formed as a single casting and which includes an elongated upstanding cylindrical shell portion 11 from the lower side of which projects a lateral knuckle 12 which is disposed within the yoke B and pivoted by a spindle bolt 13. The top of the shell 11 is closed by a cap 14 which may be integral with the shell or detachably connected therewith, as for instance by screw threading, and this cap is provided with a check valve 15. The lower end of the shell is closed by a threaded plug or cap 16 and the lower portion is formed at its side opposite the knuckle 12 with a vertically elongated slot 17 at the edges of which are small rollers 18 removably mounted so as to be replaced when unduly worn.

Movable within the body of the device is an L-shaped arm designated broadly by the numeral 19 and including an upstanding rod portion 20 and a laterally extending spindle portion 21 upon which the front wheel C of the vehicle is journaled. This spindle carries a stop flange 22 for holding the wheel in place. Naturally the wheel would be equipped with the ordinary ball or roller bearing structures and the spindle 21 must necessarily be provided with cones, nuts, etc., though these are not shown, as modifications must be made depending upon the particular type of vehicle to which my device is applied. Carried by the shell portion 11 is a plate 23 which closes the slot 17 in the shell and which has a reduced portion 24 bearing against the rollers 18.

Mounted upon the upper end of the rod portion 20 of the arm is a plunger 25 having a packing receiving groove 26, this plunger being held on the rod by having a tapered portion 27 passing through the plunger and terminating in a threaded extension upon which is engaged a nut 28. Within the upper portion of the shell is a spring 29 of suitable strength depending upon the weight of the vehicle, which bears against the cap 14 and the upper side of the plunger. Within the intermediate portion of the shell is a disk 30 held in place by grub screws 31 and formed with a central opening provided with a packing gland 32 through which the rod 20 is slidable. This disk 30 is equipped with a check valve 33 and it may also be stated that it is provided on its underside with recesses 34 for engagement by a spanner wrench so that it may be screwed into or out of place when necessary.

The body 10 is provided at a point intermediate the spindle and the knuckle with an arm 35, and it is intended that these arms be connected by the steering arm connecting rod in the usual manner, the arm 35 on one of the members also having the steering rod connected therewith.

In the operation of this form of the device it will be seen that steering of the vehicle is effected in the usual manner, the shock absorber members pivoting on the bolts 13 in exactly the same manner as the ordinary spindle bodies pivot on their spindle bolts. As the front wheels are journaled on the spindles 21 it is apparent that steering is easily effected in this manner while at the same time the vehicle is spring supported with respect to the wheels by means of the spring 29 in the shock absorbers, the shocks incident to travel being naturally absorbed instead of being communicated to the vehicle and the occupants thereof.

In adapting my device for use at the rear of the vehicle, certain changes or modifications must be made though the general arrangement is the same. In this form the shape of the body is different though it includes a shell 36 from one side of which projects an attaching plate 37 formed with holes for the passage of suitable bolts 39 which pass through the springs or the frame, as may be preferred. The slot and roller structure are omitted and the previously described arm 19 is replaced by an L-shaped bracket 40 which is bolted onto the stationary flange D at the inside of the brake structure or brake drums of the rear wheels E. The bracket 40 carries a pair of upstanding spaced parallel rods 41 which carry a plunger 42 having a packing groove 43 and bearing against the underside of a spring 44 located within and bearing against the upper end or cap 45 of the shell. Between the rods 41 is a rod 52 connected in substantially the same manner. This cap is provided with a check valve 46. At the lower end of the shell 36 is a disk 47 having a packing gland 48 through which the rods 41 slide and also having a check valve 49. This disk is screwed into the shell and is held by a grub screw 50, the underside being provided with recesses 51 for engagement by a spanner wrench.

In installing my device at the rear of the vehicle, it is not necessary that the differential housing be free with respect to the car as is now the case. In fact it is preferable that the differential housing F be bolted onto the chassis as shown at G and that the spindles H which carry the rear wheels be provided with intermediate sections having universal joint connections therein.

In the operation of this form it will be seen that the rear of the vehicle is spring supported with respect to the rear axle. It might be mentioned in passing that if necessary a rubber or leather boot may be applied to the absorbers to exclude dust, dirt, mud or water and consequently protect the interior parts from injury.

From the foregoing description and a study of the drawings it will be apparent that I have thus provided a comparatively simple and yet most efficient shock absorber adapted for use at both ends of the vehicle and which will positively absorb all the shocks and jars and prevent them from being communicated to the frame, the points of spring suspension being the nearest possible to the bearings of the wheels.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In a shock absorber a body including a shell portion and a laterally extending knuckle pivoted within the yoke at the end of the front axle of a vehicle, said body having an arm for connection with the steering arm connecting rod and steering rod, the shell being formed with a slot, a disk within the intermediate portion of the shell, an angular shaped arm member including an upstanding rod portion slidable through the disk and carrying a plunger and further including a laterally extending spindle portion extending through said slot and serving as a mounting for the front wheel, and a spring within the upper portion of the shell bearing against the closed upper end thereof and against said plunger.

2. In a shock absorber a body including a shell portion and a laterally extending knuckle pivoted within the yoke at the end of the front axle of a vehicle, said body having an arm for connection with the steering arm connecting rod and steering rod, the shell being formed with a slot, a disk within the intermediate portion of the shell, an angular shaped arm member including an upstanding rod portion slidable through the disk and carrying a plunger and further including a laterally extending spindle portion extending through said slot and serving as a mounting for the front wheel, and a spring within the upper portion of the shell bearing against the closed upper end thereof and against said plunger, the top of the shell and the disk being provided with check valves.

In testimony whereof I affix my signature.

NOBLE M. WILLIAMS.